(12) United States Patent
Bourget et al.

(10) Patent No.: US 7,626,145 B2
(45) Date of Patent: Dec. 1, 2009

(54) REDUNDANT CONTROL CIRCUIT FOR HOT MELT ADHESIVE HOSE ASSEMBLY HEATER CIRCUITS AND TEMPERATURE SENSORS

(75) Inventors: Daniel D. Bourget, Hendersonville, TN (US); Dieter B. Heerdt, Hendersonville, TN (US)

(73) Assignee: Illinois Tool Works Inc., Glenview, IL (US)

( * ) Notice: Subject to any disclaimer, the term of this patent is extended or adjusted under 35 U.S.C. 154(b) by 178 days.

(21) Appl. No.: 12/007,070

(22) Filed: Jan. 7, 2008

(65) Prior Publication Data
US 2008/0173635 A1 Jul. 24, 2008

Related U.S. Application Data

(62) Division of application No. 11/123,028, filed on May 6, 2005, now Pat. No. 7,332,692.

(51) Int. Cl.
*H05B 1/02* (2006.01)
(52) U.S. Cl. .................. 219/497; 219/485; 219/486; 219/508; 219/481; 307/39; 307/113; 307/117
(58) Field of Classification Search ............... 219/481, 219/497, 499, 501, 507, 508, 483–487; 307/117, 307/38–41, 113
See application file for complete search history.

(56) References Cited

U.S. PATENT DOCUMENTS 4,616,894 A 10/1986 Baker
4,716,520 A 12/1987 Locke, Jr. et al.
4,852,544 A 8/1989 Williams et al.
6,168,049 B1 1/2001 Bolyard, Jr.
6,342,264 B1 1/2002 Raterman et al.
6,549,034 B1 4/2003 Pietrzyk et al.
2005/0092736 A1 5/2005 Raterman et al.

FOREIGN PATENT DOCUMENTS

DE 20106348 9/2001

*Primary Examiner*—Mark H Paschall
(74) *Attorney, Agent, or Firm*—Law Offices of Steven W. Weinrieb

(57) ABSTRACT

A redundant control circuit comprises a pair of heater circuits for heating a hot melt adhesive hose assembly to a predetermined temperature level, and a pair of temperature sensors which are used to sense the temperature of the hot melt adhesive hose assembly and to control energization of the heater circuits in order to maintain the desired temperature level. A first one of the heater circuits would initially be electrically connected to the hot melt adhesive hose assembly electrical circuitry, and in a similar manner, a first one of the temperature sensors would likewise be electrically connected to the hot melt adhesive hose assembly electrical circuitry. Subsequently, should a failure occur within the first one of the heater circuits, then an electrical switch mechanism would be activated so as to effectively remove the first, failed heater circuit from the hot melt adhesive hose assembly electrical circuitry, and substantially simultaneously, electrically connect the second one of the heater circuits to the hot melt adhesive hose assembly electrical circuitry. Similar switching procedures would also be implemented in connection with the pair of temperature sensors should a failure occur within a first one of the temperature sensors initially incorporated within the hot melt adhesive hose assembly electrical circuitry.

14 Claims, 1 Drawing Sheet

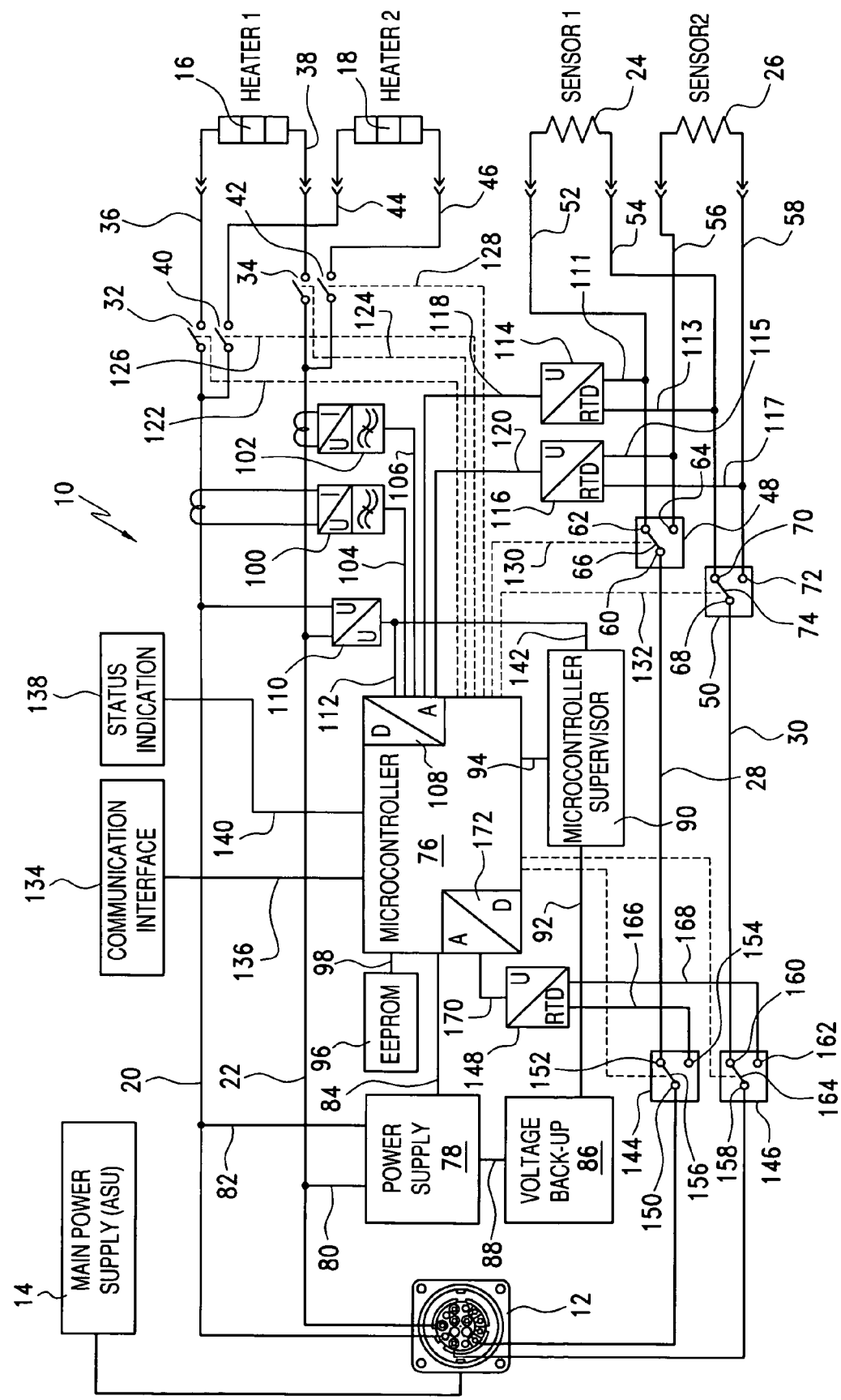

REDUNDANT CONTROL CIRCUIT FOR HOT MELT ADHESIVE HOSE ASSEMBLY HEATER CIRCUITS AND TEMPERATURE SENSORS

CROSS REFERENCE TO RELATED PATENT APPLICATIONS

This patent application is a continuation patent application of prior U.S. patent application Ser. No. 11/123,028, which was filed on May 6, 2005 now U.S. Pat. No. 7,332,692.

This patent application is related to United States patent application entitled HOT MELT ADHESIVE HOSE ASSEMBLY HAVING REDUNDANT COMPONENTS, which was filed on Jun. 8, 2007, and which has been assigned Ser. No. 11/808,378.

FIELD OF THE INVENTION

The present invention relates generally to hot melt adhesive dispensing systems, and more particularly to a new and improved redundant control circuit which effectively has redundant components inherently incorporated therein, such as, for example, redundant hot melt adhesive heater circuits, and redundant hot melt adhesive temperature sensors, whereby should a failure occur within one of the hot melt adhesive heater circuits, or within one of the hot melt adhesive temperature sensors, switch mechanisms may be suitably actuated so as to effectively withdraw the failed hot melt adhesive heater circuit, or the failed hot melt adhesive temperature sensor, from its operative or functional disposition within the electrical circuitry, and to substantially simultaneously insert the backup or redundant hot melt adhesive heater circuit, or the backup or redundant hot melt adhesive temperature sensor, into the control circuitry whereby the hot melt adhesive hose assembly does not need to be replaced immediately but can be subsequently replaced in accordance with, for example, normal scheduled maintenance procedures, the hot melt adhesive dispensing production line does not need to be shut down for repairs whereby extensive downtime to replace the failed hot melt adhesive hose assembly is effectively able to be avoided, and the hot melt adhesive dispensing production line can continue to operate without any production downtime.

BACKGROUND OF THE INVENTION

In connection with hot melt adhesive dispensing systems, failures can generally occur within two different categories, that is, mechanical failures due to wear, or electrical failures due to electrical malfunctions. More particularly, in connection with the different types of electrical failures that can be experienced, electrical failures can occur, for example, either within the heater circuit which is used to maintain the hot melt adhesive material, which is flowing through the hot melt adhesive hose assembly, at a predetermined temperature level, or within the temperature sensor which is operatively or thermally associated with the hot melt adhesive hose assembly in order to effectively detect the temperature level of the hot melt adhesive material, which is flowing through the hot melt adhesive hose assembly, and to appropriately control the heater circuit so as to effectively ensure that the desired temperature level of the hot melt adhesive material, which is flowing through the hot melt adhesive hose assembly, is in fact maintained. Maintenance of the proper or desired temperature level of the hot melt adhesive material is of course critical in order to ensure that the hot melt adhesive material will be properly dispensed, and provide the desired adhesive properties, once the hot melt adhesive material is in fact deposited onto a particular substrate. In either case, that is, whether a failure is experienced in connection with the heater circuit, or in connection with the temperature sensor, such failures typically cause the hot-melt adhesive dispensing production line to be shut down for extended periods of time, in order to implement the repair or replacement of the failed components, whereby valuable production time is lost.

A need therefore exists in the art for a new and improved redundant control circuit, for use in conjunction with a hot melt adhesive hose assembly, wherein redundant electrical components could effectively be incorporated such that if a failure occurs within a particular electrical component, the failed electrical component could effectively be removed from its operative or functional disposition within the electrical circuitry, and the other electrical component could effectively be operatively or functionally incorporated into the electrical circuitry. In this manner, the hot melt adhesive dispensing production line would not need to be shut down for extended periods of time, in order to implement the replacement of the failed hot melt adhesive hose assembly, whereby valuable production time would not be lost.

SUMMARY OF THE INVENTION

The foregoing and other objectives are achieved in accordance with the teachings and principles of the present invention through the provision of a new and improved redundant control circuit which comprises a pair of heater circuits which are adapted to be wrapped around the external peripheral surface of a hot melt adhesive hose assembly core, and a pair of temperature sensors which are also adapted to be disposed in contact with the external peripheral surface of the hose core. A first one of the heater circuits would initially be electrically connected to the hot melt adhesive hose assembly electrical circuitry, and in a similar manner, a first one of the temperature sensors would likewise be electrically connected to the hot melt adhesive hose assembly electrical circuitry. Subsequently, should a failure occur within the first one of the heater circuits, then an electrical switch mechanism would be activated so as to effectively remove the first, failed heater circuit from the hot melt adhesive hose assembly electrical circuitry, and substantially simultaneously, electrically connect the second one of the heater circuits to the hot melt adhesive hose assembly electrical circuitry. Similar switching procedures would also be implemented in connection with the pair of temperature sensors should a failure occur within a first one of the temperature sensors initially incorporated within the hot melt adhesive hose assembly electrical circuitry.

BRIEF DESCRIPTION OF THE DRAWINGS

Various other features and attendant advantages of the present invention will be more fully appreciated from the following detailed description when considered in connection with the accompanying drawing wherein:

The SOLE FIGURE comprises an electronic circuit diagram schematically illustrating the new and improved redundant control circuit, operatively associated with a hot melt adhesive hose assembly, and developed in accordance with the principles and teachings of the present invention, and showing the cooperative parts thereof.

DETAILED DESCRIPTION OF THE PREFERRED EMBODIMENT

Referring now to the drawings, and more particularly to the SOLE FIGURE thereof, the new and improved redundant control circuit, which has been developed in accordance with the principles and teachings of the present invention and which shows the cooperative parts thereof, and which is adapted to be operatively associated with a hot melt adhesive hose assembly, such as, for example, that disclosed within the aforenoted co-pending United States patent application entitled HOT MELT ADHESIVE HOSE ASSEMBLY HAVING REDUNDANT COMPONENTS, which was filed on Jun. 8, 2007, and which has been assigned Ser. No. 11/808,378, is disclosed and is generally indicated by the reference character 10. As is well known in the hot melt adhesive material dispensing art, hot melt adhesive material is normally supplied to a hot melt adhesive hose assembly, not shown, from a hot melt adhesive supply unit, also not shown, in a heated state, and a heater circuit or heater assembly is conventionally operatively associated with the hot melt adhesive hose assembly in order to maintain the hot melt adhesive material at a predetermined temperature level, while the same is being conducted through the hot melt adhesive hose assembly, such that the hot melt adhesive material will have or exhibit the proper viscosity properties when the hot melt adhesive material is dispensed from the applicator end of the hot melt adhesive hose assembly. In addition, a temperature sensor is likewise conventionally operatively associated with the hot melt adhesive hose assembly so as to effectively detect or sense the temperature level of the hot melt adhesive material being conducted through the hot melt adhesive hose assembly, and to accordingly or appropriately control the energization of the heater circuit or heater assembly, so as to again ensure the fact that the hot melt adhesive material is being heated to, and maintained at, the proper temperature level while the same is being conducted through the hot melt adhesive hose assembly, such that the hot melt adhesive material will have or exhibit the proper viscosity properties when the hot melt adhesive material is dispensed from the applicator end of the hot melt adhesive hose assembly.

As has been noted hereinbefore, electrical failures can occur within hot melt adhesive material dispensing systems either within, for example, the heater circuit or heater assembly which is used to maintain the hot melt adhesive material, which is flowing through the hot melt adhesive hose assembly, at a predetermined temperature level, or within the temperature sensor which is operatively or thermally associated with the hot melt adhesive hose assembly in order to effectively detect the temperature level of the hot melt adhesive material, which is flowing through the hot melt adhesive hose assembly, and to appropriately control the energization of the heater circuit or heater assembly so as to effectively ensure that the desired temperature level of the hot melt adhesive material, which is flowing through the hot melt adhesive hose assembly, is in fact maintained. Maintenance of the proper or desired temperature level of the hot melt adhesive material is of course critical in order to ensure that the hot melt adhesive material will be properly dispensed, and will provide the desired adhesive properties, once the hot melt adhesive material is in fact deposited onto a particular substrate. In either case, that is, whether a failure is experienced in connection with the heater circuit or heater assembly, or in connection with the temperature sensor, such failures typically cause the hot melt adhesive dispensing production line to be shut down for extended periods of time, in order to implement the replacement of the hot melt adhesive hose assembly, whereby valuable production time is lost.

It has therefore been determined that it would be desirable to effectively incorporate redundant heater circuits or heater assemblies, as well as redundant temperature sensors, into the hot melt adhesive hose assembly, and to provide a new and improved redundant control circuit for effectively controlling the activation or energization of the redundant heater circuits or heater assemblies, as well as the redundant temperature sensors, such that if a failure occurs within a particular one of the heater circuits or heater assemblies, or within a particular one of the temperature sensors, the failed heater circuit or heater assembly, or the failed temperature sensor, could readily and immediately be effectively removed from its operative or functional disposition within the electrical circuitry, and the other corresponding heater circuit or heater assembly, or temperature sensor, could readily and immediately be operatively or functionally incorporated into the electrical circuitry. In this manner, the hot melt adhesive dispensing production line would not need to be shut down for extended periods of time, in order to implement the replacement of the failed hot melt adhesive hose assembly, whereby valuable production time would not be lost.

More particularly, then, it is seen that the new and improved redundant control circuit 10, for achieving the aforenoted desirable results, comprises an electrical connector 12 which is adapted to receive electrical power from a suitable main power supply 14 which is operatively associated with an adhesive supply unit (ASU), not shown, a pair of heater circuits or heater assemblies 16,18 which are electrically connected to the electrical connector 12 by means of a first pair of primary power lines 20,22, and a pair of temperature sensors 24,26 which are electrically connected to the electrical connector 12 by means of a second pair of primary power lines 28,30. It is noted that while each one of the temperature sensors 24,26 may comprise, and has been designated in the SOLE FIGURE as a resistance temperature detector (RTD), each temperature sensor 24,26 may alternatively comprise a thermistor, or a thermocouple. It is further seen that the opposite ends of the first heater circuit or heater assembly 16 are electrically connected to the first pair of primary power lines 20,22 by means of a first pair of switch mechanisms 32,34 and a first pair of auxiliary connection lines 36,38, while the opposite ends of the second heater circuit or heater assembly 18 are electrically connected to the first pair of primary power lines 20,22 by means of a second pair of switch mechanisms 40,42 and a second pair of auxiliary connection lines 44,46.

Accordingly, it can readily be appreciated that when, for example, the first pair of switch mechanisms 32,34, operatively associated with the first heater circuit or first heater assembly 16, are both disposed at their CLOSED positions, while the second pair of switch mechanisms 40,42, operatively associated with the second heater circuit or second heater assembly 18, are both disposed at their OPEN positions, the first heater circuit or first heater assembly 16 will be electrically connected into the overall redundant control circuit 10 and will be electrically connected to the electrical connector 12 so as to receive electrical power therefrom in order to heat the hot melt adhesive hose assembly, not shown. Conversely, when, for example, the second pair of switch mechanisms 40,42, operatively associated with the second heater circuit or second heater assembly 18, are both disposed at their CLOSED positions, while the first pair of switch mechanisms 32,34 operatively associated with the first heater circuit or first heater assembly 16, are both disposed at their OPEN positions, the second heater circuit or second heater assembly 18 will be electrically connected into the overall redundant control circuit 10 and will be electrically connected to the electrical connector 12 so as to receive electrical power therefrom in order to heat the hot melt adhesive hose assembly, not shown.

Continuing further, it is similarly seen that the opposite ends of the first temperature sensor 24 are electrically connected to the second pair of primary power lines 28,30 by means of a third pair of single-throw, double-pole switch mechanisms 48,50 and a third pair of auxiliary connection lines 52,54, while the opposite ends of the second temperature sensor 26 are electrically connected to the second pair of primary power lines 28,30 by means of the third pair of single-throw, double-pole switch mechanisms 48,50 and a fourth pair of auxiliary connection lines 56,58. It is more particularly seen that the first single-throw, double-pole switch mechanism 48, of the third pair of single-throw, double-pole switch mechanisms 48,50, actually comprises a common terminal 60, a pair of alternatively selectable terminals 62, 64, and a switch member 66, while in a similar manner, the second single-throw, double-pole switch mechanism 50, of the third pair of single-throw, double-pole switch mechanisms 48,50, actually comprises a common terminal 68, a pair of alternatively selectable terminals 70,72, and a switch member 74. Accordingly, as was the case with the first and second heater circuits or first and second heater assemblies 16,18, when, for example, the third pair of switch mechanisms 48,50 are both disposed at their UPPER CLOSED positions at which the switch members 66,74 are disposed in contact with and electrically connected to the upper selectable terminals 62, 70, while simultaneously the switch members 66,74 are disposed in OPEN states with respect to the lower selectable terminals 64,72, then the first temperature sensor 24 will be electrically connected into the overall redundant control circuit 10 and will be electrically connected to the electrical connector 12 so as to receive electrical power therefrom in order to monitor the temperature level of the hot melt adhesive hose assembly, not shown, so as to, in turn, effectively control the one of the first or second heater circuits, or first or second heater assemblies, 16,18 that is currently electrically connected into the overall circuit 10. Conversely, when, for example, the third pair of switch mechanisms 48,50 are both disposed at their LOWER CLOSED positions at which the switch members 66,74 are disposed in contact with and electrically connected to the lower selectable terminals 64,72, while simultaneously the switch members 66,74 are disposed in OPEN states with respect to the upper selectable terminals 62,70, then the second temperature sensor 26 will be electrically connected into the overall redundant control circuit 10 and will be electrically connected to the electrical connector 12 so as to receive electrical power therefrom in order to monitor the temperature level of the hot melt adhesive hose assembly, not shown, so as to, in turn, effectively control the one of the first or second heater circuits, or first or second heater assemblies, 16,18 that is currently electrically connected into the overall redundant control circuit 10.

The redundant control circuit 10 is seen to further comprise a microcontroller 76 which is supplied with electrical power from a secondary power supply unit 78, and it is seen that the secondary power supply unit 78 is electrically connected to the primary power lines 20,22 through means of secondary power lines 80,82, and still further, the secondary power supply unit 78 is electrically connected to the microcontroller 76 through means of a tertiary power line 84. A voltage backup unit 86 is electrically connected to the secondary power supply unit 78 by means of an electrical connection line 88, and the voltage backup unit 86 is also electrically connected to a microcontroller supervisor unit 90 by means of an electrical connection line 92 while the microcontroller supervisor unit 90 is, in turn, electrically connected to the microcontroller 76 by means of an electrical connection line 94. Still further, an EEPROM type memory unit 96 is electrically connected to the microcontroller 76 by means of an electrical connection line 98, and it is noted that the functions and operations of these various electrical components, that is, for example, the microcontroller 76, the voltage backup unit 86, the microcontroller supervisor unit 90, and the EEPROM type memory unit 96 will be discussed and explained shortly hereafter.

Continuing further, in accordance with additional features characteristic of the new and improved redundant control circuit 10 developed in accordance with the principles and teachings of the present invention, a first current-voltage transformer or converter 100 is electrically connected to or across the primary power line 20, while a second current-voltage transformer or converter 102 is electrically connected to or across the primary power line 22. The current voltage transformers or converters 100,102 are adapted to respectively detect the current levels within the primary power lines 20,22, which alternatively feed power to the first or second heater circuits, or first or second heater assemblies, 16,18 through means of the switch mechanisms 32,34, and 40, 42, and to convert such current levels to corresponding voltage levels which are then fed into the microcontroller 76 by means of data communication lines 104,106. A first analog-to-digital converter 108 is incorporated within the microcontroller 76, and the data communication lines 104,106 are electrically connected to the first analog-to-digital converter 108 whereby the incoming analog voltage levels can be converted, by means of the first analog-to-digital converter 108, into digital voltage values which can then of course be processed by means of the microcontroller 76.

In addition, a first voltage detector 110 is electrically connected to, or across, the primary power lines 20, 22 so as to detect the voltage level existing between the two primary power lines 20,22, and the detected voltage level is fed into the first analog-to-digital converter 108 of the microcontroller 76 by means of a data communication line 112 such that the incoming analog voltage level can be converted, by means of the first analog-to-digital converter 108, into a digital voltage value which can be processed by means of the microcontroller 76. In a similar manner, second and third temperature sensor-voltage converters 114,116 are respectively electrically connected to, or across, the third and fourth pairs of auxiliary connection lines 52,54, and 56,58, by means of connection lines 111,113 and 115,117, so as to detect or determine the voltage levels existing between the third and fourth pairs of auxiliary connection lines 52,54, and 56,58, and the detected voltage levels are respectively fed into the first analog-to-digital converter 108 of the microcontroller 76 by means of data communication lines 118, 120 such that the incoming analog voltage levels can likewise be converted, by means of the first analog-to-digital converter 108, into digital voltage values which can be processed by means of the microcontroller 76.

In connection with the operation of the new and improved redundant control circuit 10 of the present invention, when the adhesive supply unit, not shown, is activated, the main power supply 14 operatively associated with the adhesive supply unit applies or transmits power to the electrical connector 12 whereby a direct current (DC) voltage will be generated and the microcontroller 76 is booted or activated. The EEPROM type memory unit 96 stores various parameters and operational profiles operatively associated with the different components comprising the electronic control circuit 10, such as, for example, the various current, voltage, power values, duty cycles, and the like, generated by, or operatively characteristic of, the heater circuits or heater assemblies 16, 18, and the temperature sensors 24,26, as conveyed to the microcontroller 76 by means of the aforenoted data communication lines 104,106,112,118,120. Accordingly, the microcontroller 76 will retrieve the most current data stored within the EEPROM type memory unit 96, and will perform various system checks comprising the current levels, voltage levels, power levels, the duty cycle, and the like. In addition, the microcontroller 76 will activate particular ones of the switch mechanisms 32,34,40,42,48,50, which are respectively connected to the microcontroller 76 by means of signal lines 122,124,126,128,130,132, such that particular ones of the switch mechanisms 32,34,40,42,48,50 will be moved to their CLOSED positions. In this manner, a particular one of the first or second heater circuits or heater assemblies 16,18, as well as a particular one of the first or second temperature sensors 24,26, will effectively be incorporated into the operative system comprising the redundant control circuit 10. It is also noted that the redundant control circuit 10 further comprises a communication interface 134 which is electrically connected to the microcontroller 76 by means of a data communication line 136, and a status indication means 138 which is electrically connected to the microcontroller 76 by means of a data communication line 140. The communication interface 134 may comprise, for example, a computer keyboard, a display panel, and the like, while the status indication means may comprise, for example, green and red LEDs, indicator lights, and the like.

It is further noted that the voltage backup unit 86 serves several functions, such as, for example, providing energy for a predetermined time period, such as, for example, several seconds, after the adhesive supply unit (ASU) has, for example, initiated a shut-down of the first or second heater circuits, or the first or second heater assemblies, 16,18, in accordance with an end-of-cycle mode of operation wherein the residual energy provided by means of the voltage backup unit 86 can nevertheless maintain the microcontroller supervisor 90 active so as to, for example, shut down the microcontroller in a controlled manner or mode. In a similar manner, the voltage backup unit 86 can provide energy during those time periods within which the first or second heater circuits, or the first or second heater assemblies, 16,18 are being operated in accordance with low duty cycles. Still further, it is noted that in addition to the voltage detector 110 being electrically connected to the microcontroller 76 by means of data communication line 112, the voltage detector 110 is also electrically connected to the microcontroller supervisor 90 by means of a data communication line 142. Accordingly, if, for example, the voltage detector 110 detects a significantly low voltage level, or the loss of voltage, for a predetermined period of time, such as, for example, several seconds, then the voltage back-up unit 86 can provide sufficient power to enable the current operating system parameters to be stored within the EEPROM type memory unit 96, and for the microcontroller supervisor 90 to again shut down the microcontroller 76 in a controlled manner or mode. It is lastly noted that at all other times, the microcontroller supervisor 90 serves to monitor the microcontroller 76 in order to determine and verify the fact that the microcontroller 76 is operating properly or within normal parameters.

It is to be noted that during normal hot melt adhesive dispensing operations or procedures, or during normal hot melt adhesive application cycles, if, for example, the switch mechanisms 32,34 have been previously moved to their CLOSED positions so as to electrically incorporate or connect the first heater circuit or first heater assembly 16 into the redundant control circuit 10, while the switch mechanisms 40, 42 have been previously moved to their OPEN positions so as to electrically disconnect or isolate the second heater circuit or second heater assembly 18 from the redundant control circuit 10, and if subsequently, for example, a heater failure is detected as a result of, for example, a significant change in the heater current as detected by means of the current-voltage transformers or converters 100,102, and as compared to, for example, the normal heater current profile data stored within the EEPROM type memory unit 96, then the microcontroller 76 will initiate a switchover of the switch mechanisms, by means of suitable signals transmitted over the signal lines 122,124,126,128, so as to move switch mechanisms 32,34 to their OPEN positions whereby the first heater circuit or first heater assembly 16 will now be electrically disconnected or isolated from the redundant control circuit 10, and substantially simultaneously therewith, to move the switch mechanisms 40,42 to their CLOSED positions whereby the second heater circuit or second heater assembly 18 will now be electrically connected to or incorporated within the redundant control circuit 10.

It is also to be noted that a heater failure can manifest itself in the form of a ground fault in connection with, for example, the first heater circuit or first heater assembly 16 if the first heater circuit or first heater assembly 16 is the heater circuit or heater assembly electrically connected to or incorporated within the redundant control circuit 10. In particular, not only should the heater circuit or heater assembly current values detected by means of the current-voltage converters or transformers 100,102 effectively be in accordance with the normal heater current profile data stored within the EEPROM type memory unit 96, but the detected values should also be the same within both of the primary power lines 20,22. If this is not the case, the first heater circuit or first heater assembly 16 may have a ground fault. Still yet further, if the current values, detected within both of the primary power lines 20,22, change suddenly, although the duty cycle remains constant, this may indicate a defective heater circuit or heater assembly whereby a switchover between the first and second heater circuits or first and second heater assemblies 16,18 would again be warranted.

It is lastly noted, in connection with the operations and connections of the first and second heater circuits or first and second heater assemblies 16,18 within the redundant control circuit 10, that it may be desirable to simultaneously activate all of the switch mechanisms 32,34,40,42 to their CLOSED positions such that both of the first and second heater circuits or first and second heater assemblies 16,18 are electrically connected to or incorporated within the electronic control circuit 10 for a predeterminedly short period of time, subsequent to which, one set of the switch mechanisms 32,34,40,42 would again be activated so as to be disposed at their OPENED position so as to serve their redundant objective. Activating all of the switch mechanisms 32, 34,40,42 to their CLOSED positions such that both of the first and second heater circuits or first and second heater assemblies 16,18 are electrically connected to or incorporated within the redundant control circuit 10 enables the system to operate in accordance with a "boost" mode whereby, for example, a rapid heating of the hot melt adhesive hose assembly to the predetermined desired temperature value within a relatively short period of time may be achieved. Alternatively, both of the first and second heater circuits or first and second heater assemblies 16,18 may be electrically connected to or incorporated within the redundant control circuit 10 under low supply voltage conditions, whereas, conversely, if the supply voltage is relatively high, the use of only one of the first and second heater circuits or first and second heater assemblies 16,18 may be necessary.

In connection with the redundant temperature sensors 24,26, it is to be noted that during normal hot melt adhesive dispensing operations or procedures, or during normal hot melt adhesive application cycles, switch members 66,74 may be respectively moved, for example, to their illustrated CLOSED positions at which the switch members 66,74 will be respectively electrically connected to terminals 62,70 so as to electrically incorporate or connect the first temperature sensor 24 into the redundant control circuit 10, whereas conversely, the switch members 66,74 will effectively be disposed at their OPEN positions with respect to terminals 64,72 so as to effectively electrically disconnect or isolate the second temperature sensor 26 from the redundant control circuit 10. During this time, both temperature sensors 24,26 are continuously monitored by means of the temperature sensor voltage converters 114,116 respectively connected across auxiliary connection lines 52,54, and 56,58, and any time a failure or an abnormality appears to have been detected in connection with one of the temperature sensors 24,26, the temperature sensors 24,26 will effectively be tested further so as to determine or verify which one of the temperature sensors 24,26 is in fact actually defective. For example, both temperature sensors should exhibit or generate the same detected voltage values. If an open or short circuit is detected within a particular one of the temperature sensors 24,26, then clearly that particular one of the temperature sensors 24,26 is defective. Accordingly, if, for example, it is determined that temperature sensor 26 is in fact defective, then the switch members 66,74 are maintained at their illustrated positions so as to maintain the temperature sensor 24 electrically connected to, or incorporated within, the redundant control circuit 10, and to concomitantly maintain the temperature sensor 26 electrically disconnected or isolated from the redundant control circuit 10. On the other hand, or conversely, if, for example, it is determined that the temperature sensor 24 is in fact defective, then signals will be transmitted from the microcontroller 76 to the switch mechanisms 48,50, by means of signal lines 130,132, so as to cause the switch members 66,74 to switch positions whereby switch member 66 will now be electrically connected to terminal 64 and switch member 74 will be electrically connected to terminal 72. In this manner, temperature sensor 26 will be electrically connected to, or incorporated within, the redundant control circuit 10, and temperature sensor 24 will be electrically disconnected or isolated from the redundant control circuit 10.

Continuing further, as has been noted hereinbefore, if an abnormality is detected in connection with the operations of the temperature sensors 24,26, then the temperature sensors 24,26 must be tested in order to determine which one of the temperature sensors 24,26 is in fact operating properly and accurately sensing the temperature level of the hot melt adhesive hose assembly. Various modes or techniques for testing the temperature sensors 24,26 are of course envisioned. For example, in accordance with a first mode or technique for testing the temperature sensors 24,26, if the current that is detected, by means of the respective one of the current-voltage transformers or converters 100,102 which are operatively associated with the particular one of the first and second heater circuits or first and second heater assemblies 16,18 which is electrically connected to or incorporated in the redundant control circuit 10, is within a valid range of values, then the temperature level of the hot melt adhesive hose assembly, as sensed by means of each one of the temperature sensors 24,26, that is, the temperature level of the hot melt adhesive hose assembly, as sensed by means of both of the temperature sensors 24,26, must attain a predetermined value. If this is not the case, that is, if such a temperature level is not in fact sensed or determined by each one or both of the temperature sensors 24,26, then either the particular one of the temperature sensors 24,26 which is not in fact sensing the proper temperature level is not properly mounted upon or operatively connected to the hot melt adhesive hose assembly, or the particular one of the temperature sensors 24,26 which is not in fact sensing the proper temperature level is defective.

In accordance with a second mode or technique for testing the temperature sensors 24,26, it is similarly noted that the temperature level of the hot melt adhesive hose assembly, as sensed by means of each one of the temperature sensors 24,26, that is, the temperature level of the hot melt adhesive hose assembly, as sensed by means of both of the temperature sensors 24,26, must attain predetermined values as a function of the duty cycle. In other words, the temperature levels of the hot melt adhesive hose assembly, as sensed by means of both of the temperature sensors 24,26, is directly proportional to the duty cycle. Accordingly, if the duty cycle is increased, an increased temperature level should be sensed, and correspondingly, if the duty cycle is decreased, a decreased temperature level should be sensed. If a particular one of the temperature sensors 24,26 is not in fact sensing the proper temperature level, in accordance with the pre-determined variations in the duty cycle, then that particular one of the temperature sensors 24,26 is defective.

Continuing further, a last unique feature characteristic of the present invention will now be described. It is to be appreciated, for example, that sometimes, despite the fact that the two temperature sensors 24,26 are in fact working properly, and that they are accurately sensing the temperature level of the hot melt adhesive hose assembly, they do not in fact sense and generate the same temperature values. This may be due, for example, to the fact that the temperature sensors are being utilized in connection with relatively large applicator heads and may be physically located at substantially different locations within the applicator head.

Therefore, it is desirable, under such conditions, to effectively build or configure a simulated temperature sensor which can effectively generate output values which comprise averaged values with respect to the temperature values actually sensed and generated by means of the two temperature sensors 24,26. These averaged values generated by means of the simulated temperature sensor will then be utilized to ultimately control the first or second heater circuits, or first or second heater assemblies, 16,18. Accordingly, in order to in fact achieve this feature or objective, it is noted that the redundant control circuit 10 may comprise an additional pair of single-throw, double-pole switch mechanisms 144,146, which may be similar to the single-throw, double-pole switch mechanisms 48,50, and a simulated temperature sensor-voltage converter 148 which is utilized in conjunction with the additional pair of single throw, double-pole switch mechanisms 144,146. The simulated temperature sensor-voltage converter 148 is effectively built or configured from suitable hardware and software incorporated within the microcontroller 76 after processing pertinent information derived from the temperature sensor-voltage converters 114,116, and the resulting simulated temperature sensor-voltage converter 148 can be adapted to be interactive with various types of adhesive supply units.

More particularly, it is noted that the additional pair of single throw, double-pole switch mechanisms 144,146, together with the simulated temperature sensor-voltage converter 148, effectively form an optional or alternative sub-circuit which may effectively be electrically connected to or incorporated within the overall redundant control circuit 10, or electrically disconnected from and isolated from the overall redundant control circuit 10. As was the case with the single-throw, double-pole switch mechanisms 48,50, the single-throw, double-pole switch mechanism 144 comprises a common terminal 150, a pair of alternatively selectable terminals 152,154, and a switch member 156, and in a similar manner, the single-throw, double-pole switch mechanism 146 comprises a common terminal 158, a pair of alternatively selectable terminals 160,162, and a switch member 164. Still further, it is seen that auxiliary connection lines 166,168 respectively connect the simulated temperature sensor-voltage converter 148 to the terminals 154,162 of the switch mechanisms 144, 146, and that a data communication line 170 connects the simulated temperature sensor-voltage converter 148 to a second analog-to-digital converter 172 which is incorporated within the microcontroller 76. In addition, it is also seen that signal lines 174,176 respectively interconnect the microcontroller 76 to the switch mechanisms 144,146 so as to cause the switch members 156,164 thereof to achieve switching functions as desired.

Accordingly, it can be appreciated still further that when the switch members 156,164 of the switch mechanisms 144, 146 are disposed at their illustrated positions, the temperature sensors 24,26 are electrically connected to or incorporated within the redundant control circuit 10 as has been previously described. On the other hand, when it is desired to effectively electrically connect or incorporate the simulated temperature sensor-voltage converter 148 within the redundant control circuit 10, suitable signals are transmitted from the microcontroller 76 so as to cause the switch members 156,164 to switch over from their illustrated positions, at which the switch members 156,164 are respectively connected to terminals 152,160, to their alternative positions at which the switch members 156,164 will be respectively connected to terminals 154,162. Therefore, the first and second temperature sensors 24,26 are effectively disconnected or isolated from the redundant control circuit 10 such that their generated or sensed temperature output signals are not utilized to control the heater circuits or heater assemblies 16,18, however, their generated or sensed temperature output signals, as transmitted to the microcontroller 76 through means of the temperature sensor-voltage converters 114,116, are nevertheless constantly utilized in conjunction with the simulated temperature sensor-voltage converter 148 and the temperature levels developed by means of the simulated temperature sensor-voltage converter 148 in order to more accurately control the heater circuits or heater assemblies 16, 18. It is lastly to be noted that even when the simulated temperature sensor-voltage converter 148 is being employed, the redundant control circuit 10 still exhibits redundancy in that both of the temperature sensors 24,26 are being used to generate their temperature level or value outputs, and are being used in conjunction with the simulated temperature sensor-voltage converter 148. In addition, if one of the temperature sensors 24,26 proves to be defective, or fails, the microcontroller 76 will effectively ignore the generated temperature level or value outputs derived from such defective or failed temperature sensor and will utilize the temperature level or value outputs derived from the other temperature sensor. Since the active temperature sensor might be generating temperature level or value outputs which are higher or lower than the averaged temperature level or value outputs generated by both temperature sensors 24,26, the microcontroller 76 may cause the simulated temperature sensor-voltage converter 148 to compensate accordingly based upon the temperature levels or value outputs previously derived from the temperature sensors 24,26 and stored, for example, as profiles within the EEPROM type memory unit 96.

Thus, it may be seen that in accordance with the principles and teachings of the present invention, there has been disclosed and described a redundant control circuit that comprises a pair of heater circuits or heater assemblies wherein each one of the pair of heater circuits or heater assemblies is adapted to heat a hot melt adhesive hose assembly to a predetermined temperature level, and a pair of temperature sensors wherein each one of the temperature sensors is used to sense the temperature of the hot melt adhesive hose assembly and to control energization of the heater circuits or heater assemblies in order to maintain the desired temperature level. A first one of the heater circuits or heater assemblies would initially be electrically connected to the hot melt adhesive hose assembly electrical circuitry, and in a similar manner, a first one of the temperature sensors would likewise be electrically connected to the hot melt adhesive hose assembly electrical circuitry. Subsequently, should a failure occur within the first one of the heater circuits or heater assemblies, then an electrical switch mechanism would be activated so as to effectively remove the first, failed heater circuit or heater assembly from the hot melt adhesive hose assembly electrical circuitry, and substantially simultaneously, electrically connect the second one of the heater circuits or heater assemblies to the hot melt adhesive hose assembly electrical circuitry. Similar switching procedures would also be implemented in connection with the pair of temperature sensors should a failure occur within a first one of the temperature sensors initially incorporated within the hot melt adhesive hose assembly electrical circuitry.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by letters patent of the United States of America, is:

1. A method of controlling electrical components of a hot melt adhesive hose assembly by means of a redundant control circuit, comprising the steps of:

providing a power source;

mounting an electrical connector upon one end portion of the hot melt adhesive hose assembly for electrically connecting the hot melt adhesive hose assembly to said power source;

operatively mounting a pair of heater assemblies upon the hot melt adhesive hose assembly so as to heat the hot melt adhesive material, fluidically conducted internally within the hot melt adhesive hose assembly, to a predetermined temperature level;

operatively mounting first switching means upon the hot melt adhesive hose assembly for selectively electrically connecting each one of said pair of heater assemblies to said power source by means of first power lines which are electrically connected to said power source through means of said electrical connector;

operatively mounting a pair of temperature sensors upon the hot melt adhesive hose assembly so as to sense the temperature level of the hot melt adhesive material, being fluidically conducted internally within the hot melt adhesive hose assembly, whereby said pair of heater assemblies can be energized in accordance with said temperature levels sensed by said pair of temperature sensors so as to maintain the temperature level of the hot melt adhesive material, being conducted internally within the hot melt adhesive hose assembly, at said predetermined temperature level;

operatively mounting second switching means upon the hot melt adhesive hose assembly for selectively electrically connecting each one of said pair of temperature sensors to said power source by means of second power lines which are electrically connected to said power source through said electrical connector;

monitoring the functionality of each one of said pair of heater assemblies;

monitoring the functionality of each one of said pair of temperature sensors; and controlling said first and second switching means so as to initially electrically connect a first one of said heater assemblies and a first one of said temperature sensors to said power source, to electrically connect a second one of said heater assemblies to said power source while disconnecting said first one of said heater assemblies from said power source if said first one of said heater assemblies is determined to be defective by said first monitoring means, and to electrically connect a second one of said temperature sensors to said power source while disconnecting said first one of said temperature sensors from said power source if said first one of said temperature sensors is determined to be defective by said second monitoring means, whereby operation of the hot melt adhesive hose assembly does not have to be shut down if one of said pair of heater assemblies and said pair of temperature sensors is defective.

2. The method as set forth in claim 1, further comprising the steps of:

configuring a simulated temperature sensor as a function of temperature data received from said pair of temperature sensors; and providing third switching means for electrically connecting said simulated temperature sensor to said power source by means of said second power lines, while electrically disconnecting said pair of temperature sensors from said second power lines.

3. The method as set forth in claim 1, further comprising the step of:

controlling said first and second switching means so as to electrically connect both of said pair of heater assemblies to said power source so as to provide the hot melt adhesive assembly with a boost in order to rapidly heat the hot melt adhesive material being conducted internally within the hot melt adhesive hose assembly.

4. The method as set forth in claim 1, further comprising the step of:

using a pair of current-voltage converters electrically connected to said first power lines for monitoring each one of said pair of heater assemblies.

5. The method as set forth in claim 1, further comprising the step of:

using a voltage detector electrically connected across said first power lines for monitoring each one of said pair of heater assemblies.

6. The method as set forth in claim 1, further comprising the step of:

using a pair of temperature sensor-voltage converters electrically connected across said second power lines for monitoring each one of said pair of temperature sensors.

7. The method as set forth in claim 1, further comprising the step of:

using a microcontroller to control said first and second switching means.

8. The method as set forth in claim 7, further comprising the step of:

utilizing memory means, operatively associated with said microcontroller, for storing operational profiles characteristic of said redundant control circuit, said pair of heater assemblies, and said pair of temperature sensors.

9. A method of controlling electrical components of a hot melt adhesive hose assembly by means of a redundant control circuit, comprising the steps of:

providing a power source;

mounting an electrical connector upon one end portion of the hot melt adhesive hose assembly for electrically connecting the hot melt adhesive hose assembly to said power source;

operatively mounting a pair of heater assemblies upon the hot melt adhesive hose assembly so as to heat the hot melt adhesive material, fluidically conducted internally within the hot melt adhesive hose assembly, to a predetermined temperature level;

operatively mounting switching means upon the hot melt adhesive hose assembly for selectively electrically connecting each one of said pair of heater assemblies to said power source by means of power lines which are electrically connected to said power source through means of said electrical connector;

operatively mounting a temperature sensor upon the hot melt adhesive hose assembly so as to sense the temperature level of the hot melt adhesive material, being fluidically conducted internally within the hot melt adhesive hose assembly, whereby said pair of heater assemblies can be energized in accordance with said temperature levels sensed by said temperature sensor so as to maintain the temperature level of the hot melt adhesive material, being conducted internally within the hot melt adhesive hose assembly, at said predetermined temperature level;

using monitoring means to monitor the functionality of each one of said pair of heater assemblies; and controlling said first switching means so as to initially electrically connect a first one of said heater assemblies to said power source, to electrically connect a second one of said heater assemblies to said power source while disconnecting said first one of said heater assemblies from said power source if said first one of said heater assemblies is determined to be defective by said monitoring means, whereby operation of the hot melt adhesive hose assembly does not have to be shut down if one of said pair of heater assemblies is defective.

10. The method as set forth in claim 9, further comprising the step of:

controlling said first and second switching means so as to electrically connect both of said pair of heater assemblies to said power source so as to provide the hot melt adhesive assembly with a boost in order to rapidly heat the hot melt adhesive material being conducted internally within the hot melt adhesive hose assembly.

11. The method as set forth in claim 9, further comprising the step of:

using a pair of current-voltage converters electrically connected to said power lines for monitoring each one of said pair of heater assemblies.

12. The method as set forth in claim 9, further comprising the step of:
   using a voltage detector electrically connected across said power lines for monitoring each one of said pair of heater assemblies.

13. The method as set forth in claim 9, further comprising the step of:
   using a microcontroller to control said switching means.

14. The method as set forth in claim 13, further comprising the step of:
   utilizing memory means, operatively associated with said microcontroller, for storing operational profiles characteristic of said redundant control circuit, said pair of heater assemblies, and said temperature sensor.

* * * * *